United States Patent [19]
Cook

[11] 4,062,414
[45] Dec. 13, 1977

[54] STATIC WEIGHING ON CONVEYOR
[75] Inventor: Frank M. Cook, San Mateo, Calif.
[73] Assignee: The Cincinnati Butchers' Supply Company, Cincinnati, Ohio
[21] Appl. No.: 743,934
[22] Filed: Nov. 22, 1976
[51] Int. Cl.² ............................................. G01G 19/06
[52] U.S. Cl. ................................ 177/145; 104/172 S; 177/163; 198/504
[58] Field of Search ....................... 177/163, 161, 145; 104/172 S; 17/24; 198/504

[56] References Cited
U.S. PATENT DOCUMENTS

| 998,540 | 7/1911 | Manes | 177/163 |
|---|---|---|---|
| 2,083,882 | 6/1937 | Ward | 177/163 X |
| 3,818,840 | 6/1974 | Dehne | 104/172 S |

Primary Examiner—Joseph W. Hartary
Attorney, Agent, or Firm—J. Warren Kinney, Jr.

[57] ABSTRACT

The scale rail of a weighing mechanism is interposed in axial alignment with the spaced adjacent ends of an elevated fixed trolley rail, and means are provided for advancing a wheeled trolley onto the scale rail after which the initial trolley-advancing means is physically disengaged from the trolley thereby permitting it to stop on the scale rail where it remains until the trolley is next engaged by second trolley advancing means which advance it along and off of the scale rail onto an adjacent section of the trolley rail. Means are provided for selectively disposing the second trolley advancing means in operative or in inoperative relationship relative to a trolley.

11 Claims, 6 Drawing Figures

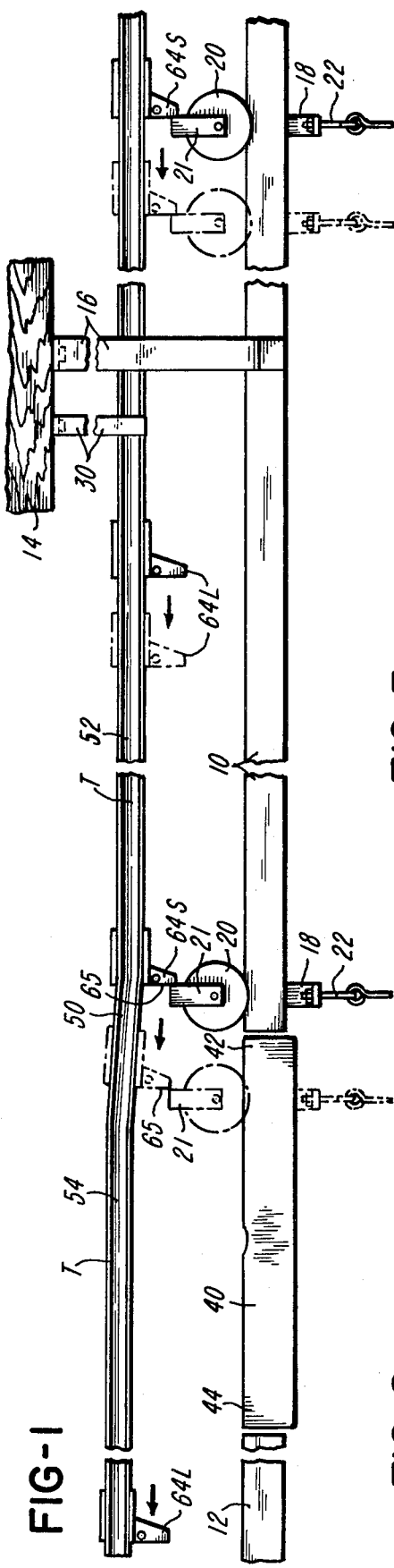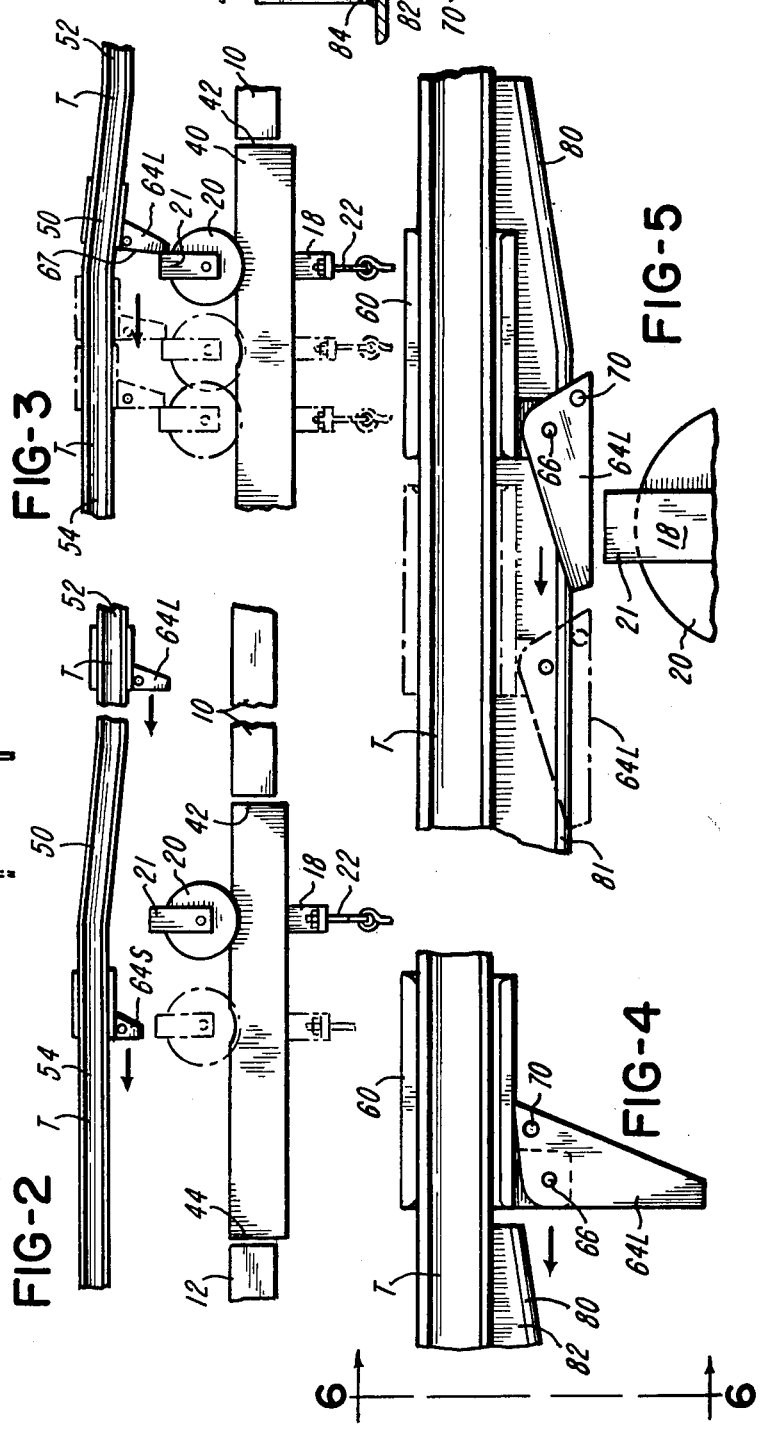

STATIC WEIGHING ON CONVEYOR

BACKGROUND OF THE INVENTION

1. Field of the Invention

The field of the invention relates to an overhead conveyor rail for load supporting trolleys, wherein the scale rail of a weight measuring device is interposed between the adjacent, spaced ends of the conveyor rail, and wherein pushers which depend from a moving chain are utilized to initially advance a trolley onto the scale rail after which the pusher is disengaged from contact with the trolley which stops on the scale rail until it is engaged by aother pusher which removes the trolley from the scale rail out onto the other side of the conveyor rail.

2. Description of the Prior Art

The Manes U.S. Pat. No. 998,450 discloses a track scale of the type wherein a trolley is advanced over an elevated, fixed rail 21 onto a scale rail 19, by means of depending pushers 24 which engage the upper portion of a trolley mounted on the fixed rail. The pushers are secured to and carried by a flexible member which is guided upwardly, away from the scale rail for effecting disengagement of the pushers carried thereby from the trolleys, whereby each trolley is adapted to coast across the scale rail during a weighing operation and thence onto the other side of the fixed rail to be thereafter engaged by a depending pusher as the flexible member is guided downwardly toward the last mentioned fixed rail.

The Hem U.S. Pat. No. 1,701,039 discloses an overhead track scale which includes a scale rail suitably interposed between the spaced ends of a fixed trolley-supporting rail, over which the trolleys are gravitationally advanced, whereby the weight of the moving trolley may be obtained.

The Ward U.S. Pat. No. 2,083,882 disclosed a device for automatically weighing articles suspended from trolleys as the trolleys are advanced along an elongated, pivotally mounted, yieldable track section 7 of a weighing mechanism. As the trolley approaches the discharge end of the yieldable track section, it is automatically elevated whereby to be elevated into horizontal alignment with the other fixed track section. The trolleys are advanced along the main track sections by depending pushers 35 which are carried by a continuously moving chain 36. When the yieldable track section is pivotally lowered by reason of the weight of a trolley thereon, pushers 35 become disengaged from the upper ends of the trolleys, thereby permitting the trolley to gravitationally traverse the inclined track.

The Williams U.S. Pat. No. 3,108,648 discloses a device for weighing trolley-supported articles as they pass over a scale rail 15, the opposite ends of which are disposed in alignment with the spaced ends of a fixed trolley-supporting rail. The patent is silent as to the manner in which the conveyors are moved along the rails.

The McClenny U.S. Pat. No. 3,622,000 discloses an overhead conveyor over which shackles suspended from a fixed rail are advanced onto an elevated scale rail which includes means for weighing the items which are conveyed by the shackles, said shackles being continuously advanced by means of an endless cable or chain member 29.

The Hebert U.S. Pat. No. 3,642,081 discloses a rail weighing device which utilizes a scale rail section in conjunction with strain-measuring means which is adapted to generate a signal which is a function of the weight of the load of the carrier. The carriers are continuously advanced from a fixed rail section onto a scale rail section and thence onto a fixed rail section by means of depending pushers 19, which are secured to, carried by and suspended from a conveyor chain 18, suitably mounted above the rails.

The Moore U.S. Pat. No. 3,842,923 discloses an overhead track scale which includes a scale rail 14, the opposite ends of which are aligned with portions of an overhead fixed rail along which a trolley is adapted to roll freely across the scale rail, thereby enabling the weight of the article suspended from the trolley to be indicated and/or recorded by means of an electrical load cell while the trolley is moving across the scale rail.

The Erik, et al U.S. Pat. No. 3,894,592 discloses a scale for measuring the weight of articles being transported along the track of a conveyor system, by means of a weight-measuring element which is inserted in and is axially aligned with the track at the weighing station.

SUMMARY OF THE INVENTION

The present invention is directed to simple, yet highlyeffective means for weighing articles suspended from wheeled trolleys which are advanced, by suitable pushers along elevated, overhead rails, onto a scale rail which is disposed in end-wise, axial alignment with respect to the laterally spaced ends of a fixed rail. As the trolleys are advanced onto the scale rail, they are automatically disengaged from the particular pusher by which the trolley has been advanced over the fixed rail to the scale rail, thereby permitting the trolley, and its load to come to rest while supported from the scale rail. While thus stationarily supported, the weight of the trolley and its contents may be indicated and/or suitably recorded. Thereafter, the trolley is engaged by the next successive pusher which will move the trolley and its supported load from the scale rail onto the other side of the fixed rail.

The disengagement of the first pusher with respect to the trolley is accomplished by elevating the pusher relative to the trolley such that contact between the pusher and the trolley is terminated; however, the trolley will be contacted by the next succeeding pusher, the length of which exceeds the length of the first pusher by an amount sufficient to engage the trolley during those periods of time when it is located on the scale rail, and thereafter while the trolley is on the other side of the fixed rail.

BRIEF DESCRIPTION OF DRAWINGS

FIG. 1 is a side view of a conveyor system embodying the teaching of the subject invention.

FIG. 2 is a fragmentary portion of the left side of FIG. 1 showing the relationship of the various parts during those periods of time when the wheeled trolley has been released from the first pusher or short drop finger on the scale rail.

FIG. 3 is a view similar to FIG. 2 showing the relationship of the parts wherein the second pusher or long drop finger has been advanced to engage the trolley disposed on the scale rail.

FIG. 4 is an enlarged side view illustrating the structural details of the second pusher or long drop finger in a depending, operative condition.

FIG. 5 is an enlarged view similar to FIG. 3 illustrating the relationship of parts in those instances in which the second pusher or long drop finger has been swung upwardly to a fully elevated, non-operative position.

FIG. 6 is a sectional view taken on line 6—6 of FIG. 4 illustrating certain of the structural details of the device.

DETAILED DESCRIPTION OF THE PREFERRED EMBODIMENTS

With particular reference to FIG. 1, the numerals 10 and 12 designate the opposite sides of a pair of fixed rails, the end of which are in spaced, axial alignment. The rails are supported from a generally horizontal supporting beam 14 by means of rigid rail hangers 16 disposed along the length of the rail. The rails extend substantial distances throughout a building for the support of a multiplicity of wheeled trolleys 18, movable individually along the length of the rail on rollers 20, which ride upon the upper edge of the rails. It will be understood that hangers 16 are suitably offset to one side of the rail, to permit the trolleys to pass the hangers as the trolleys advance along the rail. Each hanger may carry a hook 22, or equivalent device for suspending articles, such as, by way of example, sides of beef, or the like (not illustrated).

A drop finger conveyor chain 60 is supported above rails 10 and 12 by means, such as, by way of example, a pair of laterally spaced tracks, T, see FIG. 6.

Tracks T are suitably suspended from the overhead support 14 by means of rigid track hangers 30. The tracks and the conveyor chain supported thereby are disposed on three different levels with respect to the trolley and scale rails, viz a lower level 52, an upper level 54, and an upwardly inclined transition level 50 intermediate the lower and upper levels.

Conventional means, not illustrated, are utilized for imparting a continuous motion of the drop finger chain 60, to the left.

The lower level 52 is disposed in spaced parallism with that portion of the trolley rail 10 which is disposed in advance of the forward or entrance end 42 of the scale rail 40.

The inclined transition level 50 is located above the adjacent ends of trolley rail 10 and the forward or entrance end 42 of the scale rail, and the upper level 54 is disposd in spaced parallism with that portion of the scale rail at the uppermost or discharge end of the inclined transition level 50 and in spaced parallism with that portion 12 of the trolley rail which is at and beyond exit or rear end 44 of the scale rail.

With particular reference now to FIG. 6, it will be noted that chain 60 is carried by and between laterally spaced tracks T, along which the chain is guided. Lower portion 62 of the chain is adapted to provide a pivotal mount for a depending pusher or drop fingers 64S and 64L via pivot pins 66.

It will be understood that the plurality of pushers or drop fingers are thus secured to and carried at suitable intervals by the conveyor chain for movement along a path as determined by the elevation of track T relative to the conveyor and scale rails.

In FIG. 1 the numeral 64S designates a first pusher or drop finger which is shorter than the next successive longer, or second drop finger 64L. The length of pushers or drop fingers 64S is such that while suspended from the lower level 52, their forward surfaces 65 are adapted to engage the upper portion or harp 21 of a wheeled trolley 18 during those periods of time when the trolleys are mounted on fixed rail 10 for movement to the left, whereby the wheeled trolleys are positively advanced to the left over fixed rail 10 onto the forward or entrance end 42 of the scale rail 40. However, as pusher 64S is further advanced to the left, up the inclined transition level 50 of the track, the degree of contact between forward surface 65 and harp 21 of a trolley is progressively lessened until the lower end of the pusher or drop finger is elevated out of contact with the trolley, with the result that the trolley will, within a short distance, come to a stop on the scale rail 40. The present invention is neither directed to nor concerned with the structural details of the particular means by which the weight of a trolley and its suspended load is applied to a weighing mechanism via the scale rail 40. Any suitable weight-indicating mechanism which is capable of being actuated by movement of the scale rail 40 under the load of a trolley, may be utilized for indicating, printing, and/or recording the weight of the trolley-suspended items on the scale rail. By way of example, the weighing, or weight-indicating means as actuated by the weight of a trolley on the scale rail 40, may be as illustrated in one or the other of U.S. Pat. No. 3,842,923; 998,540; 3,108,648; or 1,701,039.

If desired, or necessary, suitable means (not illustrated) may be utilized to insure that forward movement of the trolley will stop with the trolley on the scale rail 40 after disengagement from drop finger 64S. One simple means may comprise a low spot in the upper surface of the scale rail into which the trolley rollers may gravitate. Another means may comprise a scale rail carried, spring loaded, brake rail which includes a pair of spaced braking surfaces between which the hangers are caused to pass en route across the scale rail.

FIG. 2 illustrates the relative location of a hanger, scale rail, and short pusher or drop-finger 64S during those periods of time when the pusher is supported from the elevated, lower level 52 of the track T.

As illustrated in FIGS. 2–3, movement of the pusher or long drop finger 64L to the left will result in its forward surface 67 engaging harp 21 of the stationary trolley 18 which is supported on the scale rail 40, it being understood that the long pusher 64L will advance the trolley across the scale rail off the rear or exit end 44 thereof, onto the scale-rail-adjacent end of trolley rail 12. It will, of course, be understood that pusher or drop finger 64L will continue to move the trolley over rail 12.

With reference now to FIGS. 4, 5, & 6, means are illustrated for automatically elevating a long depending pusher or drop finger 64L from its fully lowered operative position of FIG. 4 to an elevated, inoperative position of FIG. 5, by means of a pin or cam follower 70, which as best illustrated in FIG. 6, is secured to and carried by the drop finger at a location above and rearwardly of pivot 66. As the drop finger 64L is advanced to the left, pin 70 is adapted to engage the downwardly inclined surface 80 of a substantially L-shaped cam 82 which, as illustrated in FIG. 6, is rigidly affixed such as, by means of a weld 84, or the like, to the lower end of a rigid support 30, or from the lower edge of a track T. As drop finger 64L continues to move to the left relative to inclined portion 80, the forward end of said member will be pivoted upwardly to the fully elevated or raised position illustrated in FIg. 5, in which elevated position it will remain so long as the cam follower 70 engages the elongate, rearwardly extending horizontal portion 81 of the cam which is disposed in substantial parallelism with the track. When in an elevated position, the pusher 64L will clear engagement with the harp 21 of a trolley 18, as illustrated.

It should be understood that track T may, if desired, be lowered via a downwardly inclined portion (not illustrated) from its elevated level 54 to its lower lever 52 at a location beyond the location of the scale rail whereby the harp 21 of the trolleys may be engaged by the short pushers or drop fingers 64S.

With reference again to FIG. 5, it will be noted that the means for elevating the longer pushers or drop fingers 64L will be disposed, where needed, along the lower portions of track T, such as, by way of example, in those instances in which the required spacing between the drop fingers is so close as to make automatic feeding of the trolleys by the short drop fingers 64S difficult.

In the preferred embodiment of the invention, those portions 80 and 81 of the cam which are engaged by the cam follower 70 are coated or otherwise provided with a sheath of material such as "Teflon" or the like which is characterized by a low coefficient of friction and excellent wear properties.

From the foregoing, it will be noted that I have thus provided a simple, yet highly effective, fool-proof means for intermittently advancing trolleys along a substantially horizontal trolley rail to a scale rail which is interposed along the length of the trolley rail, whereby the ability of a weighing mechanism to accurately determine and/or record the weight of articles suspended from trolleys which are disposed on the scale rail, is not impaired by contact between the trolley advancing means and the trolleys.

It should be understood that the drop fingers are pivotally mounted whereby to resist rearward movement in a counterclockwise direction from a depending position, whereas they are adapted to be swung upwardly about their pivot pins 66, in a clockwise direction, from a depending position.

What is claimed is:

1. A static weighing-on conveyor comprising:
  an elevated trolley rail,
  a scale rail interposed between spaced, adjacent ends of the trolley rail,
  an endless conveyor chain,
  means supporting portions of said chain at lower, upper and inclined transition levels between said lower and upper levels,
  means imparting movement of the chain along and relative to said supporting means,
  a plurality of alternately short and long drop fingers pivotally secured to, carried by, spaced along and depending from said chain,
  a wheeled trolley supported on and selectively movable over the trolley and scale rails by first a short drop finger and then by the next succeeding long drop finger,
  the said lower level of the chain disposing the short drop fingers in contacting engagement with an upper portion of a trolley and wherein said fingers are automatically and progressively disengaged from a trolley as the chain passes upwardly along the inclined transition level as the trolley is advanced from one end of the trolley rail onto the scale rail,
  the said transition and upper levels of the chain disposing the long drop fingers in contacting engagement with that upper portion of a trolley which was disengaged by a preceding short drop finger for advancing a trolley from the scale rail onto the other end of and thence along the trolley rail.

2. A device as called for in claim 1, wherein the scale rail has an entrance end adjacent one end of the trolley rail.

3. A device as called for in claim 1, wherein the means supporting said chain comprises an elongate chain track which is disposed in various spaced relationships with and above the trolley and scale rails.

4. A device as called for in claim 2, wherein the lower level is located above and in spaced parallelism with that portion of the trolley rail which is in advance of the entrance end of the scale rail; the inclined transition level is located above that end of the trolley rail adjacent the entrance end of the scale rail; and wherein the upper level is located above the scale rail at the upper end of the transition level and thence above and along that portion of the trolley rail which is at and beyond the end of the scale rail.

5. A device as called for in claim 3, which includes means for selectively elevating and maintaining the long drop fingers in an elevated position out of contacting relationship with the wheeled trolleys during movement of said drop fingers along selected portions of the trolley rail.

6. A device as called for in claim 5, wherein the means for selectively elevating and maintaining the long drop fingers in an elevated position constitute a cam and a cam follower, wherein the cam is secured to and depends from the cam track, and wherein the cam follower is secured to and carried by the long drop finger.

7. A device as called for in claim 6, wherein the cam includes a downwardly inclined forward portion which is initially engagable by a cam follower for elevating a long drop finger from a depending to a substantially horizontal position, and an elongate, rearwardly extending horizontal portion engageable by the cam follower for maintaining a long drop finger in a substantially horizontal position as it is advanced along and relative to the trolley rail.

8. A device as called for in claim 1, wherein the scale rail includes means for maintaining a wheeled trolley in a stationary position on the scale rail after said trolley has been disengaged from a short drop finger and before being engaged by the next long drop finger.

9. A static weighing-on conveyor comprising:
  an elevated trolley rail,
  a scale rail interposed between spaced, adjacent ends of the trolley rail,
  an endless conveyor chain,
  means supporting certain portions of said chain at a lower level which is located above and in substantial spaced parallelism with that portion of the trolley rail which is in advance of the scale rail; said means supporting other portions of the chain at an upper level which is higher above said trolley rail than the elevation of said first level with respect to the trolley rail and in substantial parallelism with that portion of the trolley rail which is to the rear of the scale rail; said means supporting still other portions of the chain along an upwardly inclined transition level which spans the adjacent ends of the scale and trolley rails between said lower and upper levels, wherein said transition level terminates at the upper level above and intermediate the length of the scale rail; and A plurality of alternately long and short drop fingers pivotally secured to, carried by, spaced along, and depending from said chain.

10. A device as called for in claim 9, wherein the means supporting said chain comprises an elongate chain-track which is disposed in spaced relationship with the scale and trolley rails.

11. A device as called for in claim 10, which includes means for pivoting the long drop fingers from a normally depending position to an elevated position as said drop fingers are moved relative to and along selected portions of the chain-track.

* * * * *